(12) United States Patent
Lussey

(10) Patent No.: US 11,339,270 B2
(45) Date of Patent: May 24, 2022

(54) CONDUCTIVE POLYMER

(71) Applicant: David Lussey, Tunstall (GB)

(72) Inventor: David Lussey, Tunstall (GB)

( * ) Notice: Subject to any disclaimer, the term of this patent is extended or adjusted under 35 U.S.C. 154(b) by 0 days.

(21) Appl. No.: 15/738,805

(22) PCT Filed: Jun. 27, 2016

(86) PCT No.: PCT/GB2016/051920
§ 371 (c)(1),
(2) Date: Dec. 21, 2017

(87) PCT Pub. No.: WO2016/207667
PCT Pub. Date: Dec. 29, 2016

(65) Prior Publication Data
US 2018/0186965 A1    Jul. 5, 2018

(30) Foreign Application Priority Data
Jun. 25, 2015   (GB) ...................... 1511198

(51) Int. Cl.
| | |
|---|---|
| *H01B 1/22* | (2006.01) |
| *C08K 3/22* | (2006.01) |
| *C08K 3/08* | (2006.01) |
| *C08K 7/18* | (2006.01) |
| *C08L 7/00* | (2006.01) |
| *C08L 27/06* | (2006.01) |
| *C08L 31/04* | (2006.01) |
| *C08L 33/02* | (2006.01) |
| *C08L 75/04* | (2006.01) |
| *C08L 83/04* | (2006.01) |

(52) U.S. Cl.
CPC .................. *C08K 3/22* (2013.01); *C08K 3/08* (2013.01); *C08K 7/18* (2013.01); *C08L 7/00* (2013.01); *C08L 27/06* (2013.01); *C08L 31/04* (2013.01); *C08L 33/02* (2013.01); *C08L 75/04* (2013.01); *C08L 83/04* (2013.01); *C08K 2003/0862* (2013.01); *C08K 2003/2275* (2013.01); *C08K 2201/001* (2013.01); *C08K 2201/005* (2013.01)

(58) Field of Classification Search
CPC .. H01B 3/004; H01B 1/22; G01L 1/20; C08K 2003/0862; C08K 2003/2275
USPC .................................................. 252/511, 513
See application file for complete search history.

(56) References Cited

U.S. PATENT DOCUMENTS

| | | | | |
|---|---|---|---|---|
| 4,470,898 | A * | 9/1984 | Penneck ................ | H01B 3/004 252/511 |
| 2011/0253948 | A1* | 10/2011 | Lussey ..................... | G01L 1/20 252/513 |
| 2012/0261171 | A1* | 10/2012 | Yamada ..................... | C09J 5/06 174/255 |

OTHER PUBLICATIONS

T255 Nickel Powder, Vale Canada Limited, Feb. 2011.*

* cited by examiner

*Primary Examiner* — Khanh T Nguyen
(74) *Attorney, Agent, or Firm* — Jackson Walker LLP

(57) ABSTRACT

A polymer composition comprises at least one substantially non-conductive polymer binder and at least first and second electrically conductive fillers, wherein the first electrically conductive filler is comprised of particles having a void bearing structure, and the second electrically conductive filler is comprised of particles which are substantially spherical in shape.

20 Claims, 2 Drawing Sheets

CONDUCTIVE POLYMER

RELATED APPLICATIONS

This application is a national stage entry under 35 U.S.C. § 371 of PCT/GB2016/051920, entitled "Improved Conductive Polymer" and filed Jun. 27, 2016. The prior application is herein incorporated by reference in its entirety.

FIELD OF THE INVENTION

The present invention relates to conductive polymers and in particular to conductive polymers in which conduction is by tunnelling.

BACKGROUND OF THE INVENTION

Electrically conductive polymer compositions which exhibit changing electrical resistance when subject to compressive or tensile forces are known. Typically, these compositions comprise void bearing particles and conduct by quantum tunnelling.

Quantum tunnelling describes a conduction mechanism which occurs when the inter particle distance decreases such that the insulating barriers between adjacent conductive particles are so thin that quantum tunnelling occurs through the thin insulating barriers. The presence of spikes and voids in the filler particles amplifies the electric fields within the composites. Large resistance ranges are a consequence of field-enhanced quantum tunnelling.

Field-enhanced tunnelling occurs with filler particles that contain voids. Voids are defined by considering an imaginary closed surface tracing the protrusions on the particles. If the volume enclosed by the imaginary closed surface is larger than the volume of the filler particle this indicates the existence of protrusions on the filler particles. These protrusions are the source of field-enhanced tunnelling. The degree of field enhancement is dependent on the number and sharpness of the protrusions. It is voids between external protrusions that are referred to in this specification, not voids in hollow materials such as carbon nanotubes.

Void bearing particles are particles such as spiky nickel.

GB2450587 describes an electrically conductive polymer composition comprising a non-conductive polymer binder, first electrically conductive filler particles that are void bearing and second electrically conductive filler particles that are acicular.

The invention described in GB2450587 is said to reduce noise and to allow the relationship between compression and change in resistance to be better controlled.

Whilst the use of electrically conductive acicular particles allow the start resistance of the composite to be reduced, a start resistance nevertheless remains. Further, whilst the use of electrically conductive acicular particles may reduce noise, the electrical signal nevertheless remains noisy, since noise is associated with field enhanced quantum tunnelling.

It would be desirable to produce an electrically conductive polymer that is sensitive to changes in pressure, has a wide working range and which exhibits low noise.

Surprisingly, it has been found that by mixing electrically conductive void bearing particles, such as spiky nickel with electrically conductive particles that are spherical in shape, an electrically conductive polymer with enhanced performance characteristics can be produced.

The term, "substantially spherical" is not limited to spherical particles only having a smooth surface. A particle that has many sides and fits within a sphere such as an octahedron or a dodecahedron for example would be considered to be substantially spherical in the context of this invention.

SUMMARY

According to the invention there is provided a polymer composition comprising at least one substantially non-conductive elastomeric polymer binder and at least first and second electrically conductive fillers, wherein the conductivity of the polymer composition in an unstressed state is related to the conductivity of the elastomeric non-conductive polymer binder and in a stressed state to the conductivity resulting from the presence of the at least first and second electrically conductive fillers in the composition, characterised in that the first electrically conductive filler is comprised of particles having a void bearing structure, and the second electrically conductive filler is comprised of particles which are substantially spherical in shape.

Preferably, the second electrically conductive filler is comprised of magnetite.

Advantageously, the magnetite is synthetic magnetite.

The magnetite may be naturally occurring magnetite processed such that the particles are substantially spherical in shape.

The magnetite may be a mixture of synthetic and naturally occurring magnetite processed such that the particles are substantially spherical in shape.

Preferably, the particle size of the magnetite, whether synthetic magnetite or processed naturally occurring magnetite is five micron or less, and more preferably less than one micron. More preferably, the magnetite particles are between 0.1 and 0.3 micron and still more preferably around 0.2 micron.

Preferably, the first electrically conductive filler is spiky nickel. Advantageously, the particle size of the spiky nickel is around 3 micron. The form of spiky nickel used may be Vale nickel 123 or nickel 255.

The polymer composition is configured such that it exhibits two modes of conduction: a standard tunnelling conduction mode at times with hopping conduction and a field assisted tunnelling conduction mode. The onset of field assisted tunnelling in these composites is detectable as it produces a characteristic change in electrical noise levels and is often accompanied by the production of radio frequency energy. Such changes can be monitored using an oscilloscope or similar device.

The particular mode of conduction exhibited by the polymer composition depends on the operating current. Below a threshold operating current the tunnelling mechanism is standard tunnelling sometimes with hopping conduction and above that threshold the tunnelling mechanism is field enhanced tunnelling.

The mode of conduction also depends on the force applied to the material and it has been found that different modes of conduction occur in three phases: a first phase where the mode of conduction is standard tunnelling with hopping conduction; a second phase where the mode of conduction is predominately field enhanced tunnelling; and a third phase where the mode of conduction reverts back to standard tunnelling with hopping conduction.

The sensitivity of the polymer composition to the application of force may be tuned by changing the relative amounts of electrically conductive filler to non-conductive binder and/or by adjusting the relative proportions of the first and second electrically conductive fillers and/or by selection of the polymer hardness and/or by selection of the polymer thickness. Polymer thickness may be selected by increasing the solvent (for example water) content of the polymer during mixing of the composition and then applying heat to drive off the solvent post mixing. Heating to dry the composition is typically conducted at a low temperature, preferably less than 100 C. and typically between 90 and 100 C., Where silicone is the binder typically the composition is room temperature cured.

By selecting a polymer of comparatively greater hardness, the composition will deflect less when subject to a certain force and hence the distance between electrically conductive particles within the polymer will decrease less for the same applied force, that is a harder polymer gives a smaller force response. Conversely, selecting comparatively less hard polymer results in a greater force response.

Most non-conductive elastomeric polymers would function as a suitable binder. The elastomeric binder allows the electrically conductive particles contained therein to move towards and away from each other according to the force applied to the composition. Examples of polymer binders include: polyurethane, natural rubber, polyvinyl acetate, polyvinyl chloride, acrylic polymers and silicone.

The binder thickness between particles may be controlled by controlling the proportion of binder to particles and by the selection of solvents used to provide a binder in a liquid state for mixing, and which turns to a semi-rigid state post mixing. The solvent may be selected so that it evaporates to leave a thin polymer layer around the particles. In order to evaporate the solvent, heat (up to what temperature) may be applied during and/or after the mixing phase. Where the binder is a polymer, the polymer may be subject to a cross-linking process to create a semi-rigid substance post mixing.

Advantageously, the binder forms a thin layer around each particle in the particle distribution. The layer thickness is typically in the order of tens of nano-metres.

By including electrically conductive filler of particles that are spherical in shape the whole composition is less susceptible to damage by shear forces than those compositions of the prior art discussed above.

The polymer composition of the invention provides an anisotropic response to the application of pressure, that is the application of pressure to the material at a particular location causes the resistance of the material to change at that location only. This particularly useful for touch sensors. In the absence of pressure the polymer composition is unstressed and does not conduct, that is there is no measurable start resistance.

According to another aspect of the invention there is provided a force sensor comprising a polymer composition comprising at least one substantially non-conductive elastomeric polymer binder and at least first and second electrically conductive fillers, wherein the conductivity of the polymer composition in an unstressed state is related to the conductivity of the elastomeric non-conductive polymer binder and in a stressed state to the conductivity resulting from the presence of the at least first and second electrically conductive fillers in the composition, characterised in that the first electrically conductive filler is comprised of particles having a void bearing structure, and the second electrically conductive filler is comprised of particles which are substantially spherical in shape.

The material may provide for both switching (field assisted tunnelling) and sensing (conductive tunnelling) in a single device.

The polymer composition is particularly useful as a force sensor.

The polymer composition may be utilised in the form of: thin films; sheets; filaments; filament coatings; 3D printing feedstock; textiles.

DETAILED DESCRIPTION OF ILLUSTRATIVE EXAMPLES

Figure 2:
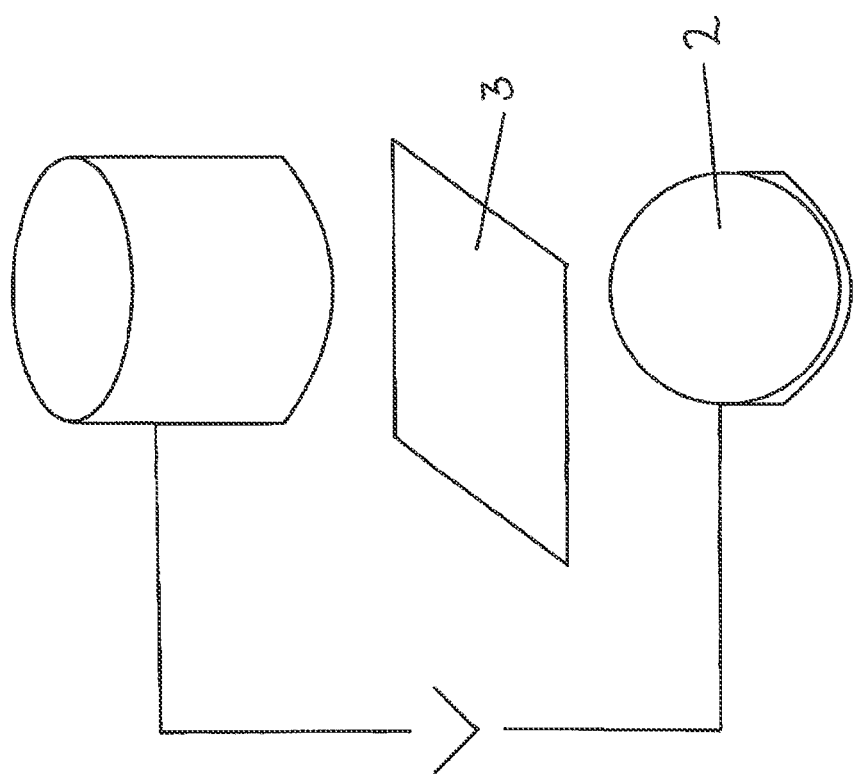
FIG. 2 is a schematic representation of the test electrode used to collect the data represented in the graphs of FIG. 1.

In each of the Examples Vale Nickel 123 was mixed with Bayferrox 4330 synthetic magnetite in a Witcobond 781 polyurethane binder. The minimum amount of the composite to form a spreadable coating was applied to fine organza net to form a 40 mm×40 mm sample having a thickness of 0.16 mm. The test electrode used in the Examples is illustrated in FIG. 2 and comprised an upper electrode 1 in the form of a 5 mm diameter gold plated rod conductor, a lower electrode 2 in the form of a silver plated metal disc 10 mm in diameter and the sample 3. The upper and lower electrodes are brought into contact with the sample 3, and a potential difference was applied through the electrodes 1, 2 to the sample. An increasing force was applied to the sample 3 by the electrodes 1, 2. The applied force was measured. The change in current was measured and the changing resistance calculated Example 1

10 g Nickel 123 were mixed with 10 g synthetic magnetite and 16.0 g of polyurethane binder.

Example 2

10 g Nickel 123 were mixed with 6 g synthetic magnetite and 10.0 g of polyurethane binder.

Example 3

10 g Nickel 123 were mixed with 5 g synthetic magnetite and 8.5 g of polyurethane binder.

Example 4

10 g Nickel 123 were mixed with 4 g synthetic magnetite and 7.0 g of polyurethane binder.

Example 5

10 g Nickel 123 were mixed with 2 g synthetic magnetite and 5.5 g of polyurethane binder.

Example 6

10 g Nickel 123 were mixed with 0.6 g synthetic magnetite and 4.0 g of polyurethane binder.

Example 7

10 g Nickel 123 were mixed with 0.2 g synthetic magnetite and 3.5 g of polyurethane binder.

Figure 1:
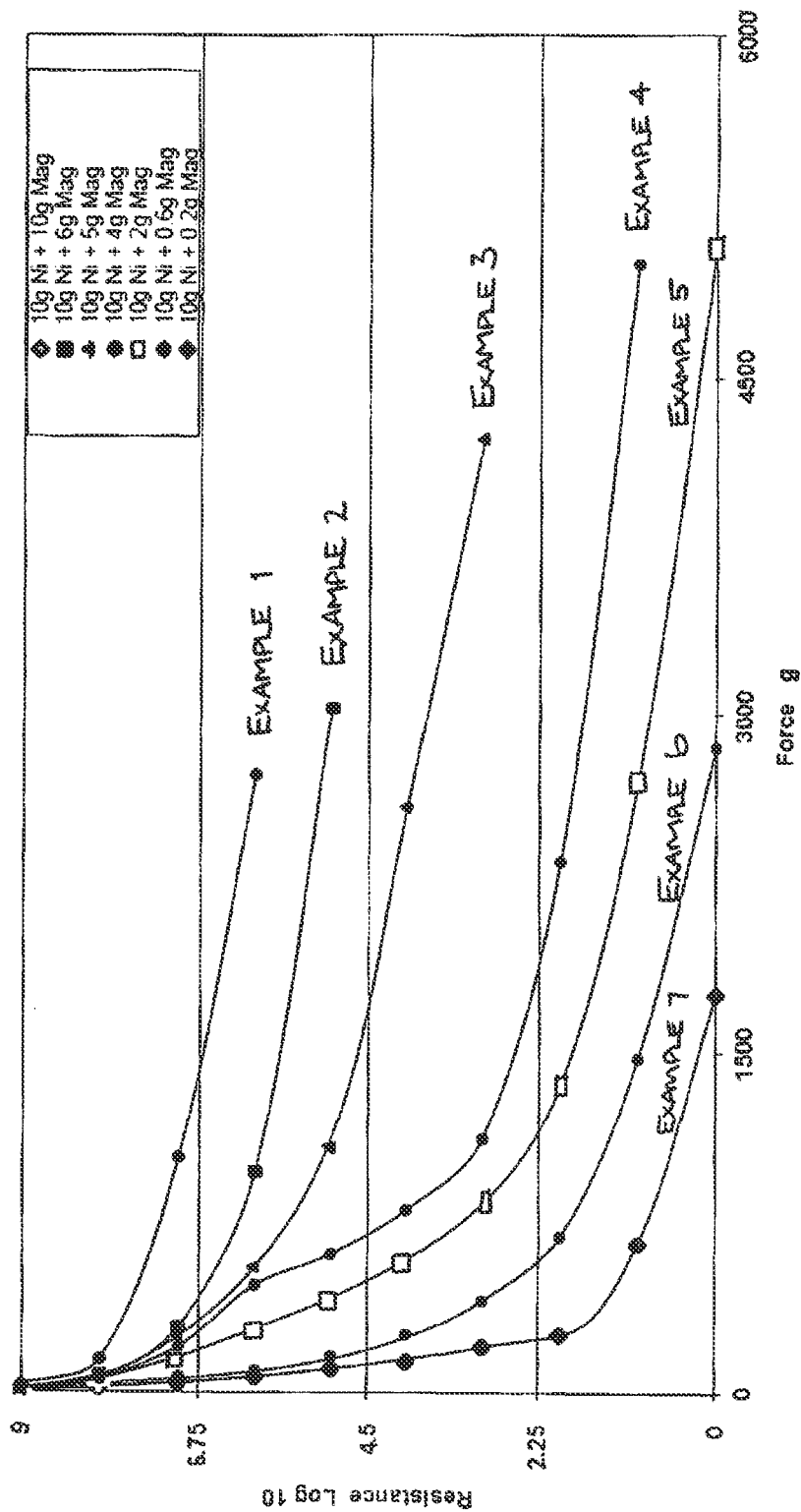
FIG. 1 is a graph showing the change in resistance with changing force for each of seven different examples (see section entitled, "Examples" below) of the material of the invention.

Table 1 (below) and the graphs of FIG. 1 illustrate the effect on resistance of changing the force applied to the composites of Examples 1 to 7 when a potential difference of 5 volts is applied thereto.

TABLE 1

Resistance (log 10) v Force g, Nickel 123 with Magnetite Bayferrox 4330

| R | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
|  | 10 g Ni + 10 g Mag | 10 g Ni + 6 g Mag | 10 g Ni + 5 g Mag | 10 g Ni + 4 g Mag | 10 g Ni + 2 g Mag | 10 g Ni + 0.6 g Mag | 10 g Ni + 0.2 g Mag |
| 9 | 30 | 15 | 7 | 7 | 3 | 8 | 2 |
| 8 | 146 | 74 | 71 | 58 | 33 | 40 | 19 |
| 7 | 1040 | 285 | 245 | 200 | 147 | 70 | 39 |
| 6 | 2733 | 975 | 550 | 471 | 280 | 98 | 67 |
| 5 |  | 3030 | 1080 | 609 | 403 | 160 | 103 |
| 4 |  |  | 2586 | 805 | 560 | 255 | 134 |
| 3 |  |  | 4223 | 1123 | 850 | 403 | 201 |
| 2 |  |  |  | 2350 | 1352 | 685 | 252 |
| 1 |  |  |  | 500 | 2702 | 1476 | 653 |
| 0 |  |  |  |  | 5070 | 2856 | 1760 |

As can be seen, Example 7 is most sensitive to changes in applied force, that is the resistance of the material of Example 7 changes the most per unit of force applied.

For each example where no force is applied the start resistance is substantially infinite, that is the material of each example behaves as an insulator. For the materials of each of the Examples 1 to 7, the response to the application of an increasing force is a significant reduction in resistance.

The curve for each of the Examples 1 to 7 exhibits a rapid decrease in resistance upon the initial application of force, followed by a more steady decrease in resistance as the applied force continues to increase.

It is believed that the initial rapid decrease in resistance of the composite material is due to field assisted tunnelling from the spikes of the spiky nickel particles, and that the steady decrease in resistance is due to standard tunnelling and hopping conduction associated with the synthetic magnetite particles. This is borne out by the results which show that where the composite includes the greater proportion of synthetic magnetite the more rapid the change in resistance upon application of a force occurs for a smaller range of resistance, after which the rate of change of resistance for an increasing force decreases.

In the region of the curve where the relationship between applied force and resistance is not as marked it is believed that percolative conduction predominates, percolative conduction including standard tunnelling conduction and hopping conduction.

The two distinct characteristics exhibited by the material of the invention make it suitable for different uses. In the part of the curve where resistance changes very rapidly the material may function as a switch, whereas in the part of the curve where the change in resistance is much slower the material may be used for sensing. It is conceivable that the material could be used to provide a switched sensor, that is the material may sense a parameter up to a threshold and when the threshold is exceeded switch an electric circuit on or off.

It has been found that the noise associated with signals passing through the material of the invention as compared to the material of GB2450587 is much reduced, in both parts of the curve, although noise is greater in part of the region of the curve where change in resistance is more rapid.

Noise and Phases of Conduction

The materials of the invention all exhibit a similar noise profile which is understood to relate to the conduction mechanism. Each Example exhibits the same three phases of operation and each phase of operation has a distinctive type of conduction.

Phases of Conduction

Phase 1—this phase occurs during the initial contact with the surface of the material. In this phase the contact force is very low, there is very low conduction (hence low current density) and very high resistance. The mode of conduction is understood to be standard tunnelling and hopping conduction.

Phase 2—As the force on the material increases the material operates in the second phase. In phase 2 there is a very rapid, non-linear drop in resistance (and hence an increase in current density) as the pressure increases. In phase 2 the mode of conduction is predominantly field enhanced tunnelling. The increasing force brings the particles sufficiently close together and the current density increasing sufficiently for the spikes of the spiky nickel to exhibit field enhanced tunnelling. The noise level increases as the material switches from phase 1 to phase 2 and continues to increase until a peak is reached.

Phase 3—The pressure on the material is increased still further. The increased pressure causes the conductive particles to come closer together, so close in fact that the mechanism of standard tunnelling and hopping conduction once again predominates. Noise levels fall dramatically as the mode of conduction changes from field enhanced tunnelling to standard tunnelling and hopping conduction.

The noise profile for Examples 1 and 7 was assessed by viewing a trace on an oscilloscope that was connected to the test electrode as the force on the sample was increased.

For both Examples 1 and 7, phase 1 conduction commenced above $10^9$ ohms.

For Example 1, the change over from conduction phase 1 to conduction phase 2 occurs at about $10^9$ ohms. The change over from phase 2 conduction to phase 3 conduction occurs at about $10^8$ ohms.

For Example 7, the change over from conduction phase 1 to conduction phase 2 occurs at about $10^3$ ohms. The change over from phase 2 conduction to phase 3 conduction occurs at about $10^1$ ohms.

The invention claimed is:

1. A polymer composition comprising at least one non-conductive elastomeric polymer binder and at least first and second electrically conductive fillers, wherein the polymer composition has a conductivity in an unstressed state that is related to the non-conductive elastomeric polymer binder's conductivity and wherein the polymer composition has a conductivity in a stressed state that is related to conductivity resulting from the presence of the at least first and second electrically conductive fillers in the composition, wherein the first electrically conductive filler is comprised of particles having a void bearing structure, and the second electrically conductive filler is comprised of particles which are substantially spherical in shape, wherein the composition is electrically anisotropic, an electrical resistance of the composition changing immediately and only around a point of exertion of pressure on the composition, the change in resistance being anisotropic and in accordance with the pressure exerted thereon, the resistance reducing with increased applied pressure and increasing with reduced applied pressure, between a quiescent state in the absence of pressure and an electrically conducting state when the composition is subject to an applied pressure.

2. A polymer composition according to claim 1, wherein the second electrically conductive filler is comprised of magnetite.

3. A polymer composition according to claim 2, wherein the magnetite is synthetic magnetite and/or naturally occurring magnetite processed such that the particles are substantially spherical in shape.

4. A polymer composition according to claim 2, wherein the magnetite has a particle size of five microns or less.

5. A polymer composition according to claim 4, wherein the particle size of the magnetite is less than one micron.

6. A polymer composition according to claim 5, wherein the particle size of the magnetite is between 0.1 and 0.3 micron.

7. A polymer composition according to claim 6, wherein the particle size of the magnetite is around 0.2 micron.

8. A polymer composition according to claim 1, wherein the first electrically conductive filler is spiky nickel.

9. A polymer composition according to claim 8, wherein the particle size of the spiky nickel is around 3 micron.

10. A polymer composition according to claim 1, wherein the polymer binder is one of: polyurethane, polyvinyl acetate, polyvinyl chloride, an acrylic polymer, natural rubber and silicone.

11. A force sensor comprising a polymer composition comprising at least one non-conductive elastomeric polymer binder and at least first and second electrically conductive fillers, wherein the polymer composition has a conductivity in an unstressed state that is related to the non-conductive elastomeric polymer binder's conductivity and wherein the polymer composition has a conductivity in a stressed state that is related to conductivity resulting from the presence of the at least first and second electrically conductive fillers in the composition, wherein the first electrically conductive filler is comprised of particles having a void bearing structure, and the second electrically conductive filler is comprised of particles which are substantially spherical in shape, wherein the composition is electrically anisotropic, an electrical resistance of the composition changing immediately and only around a point of exertion of pressure on the composition, the change in resistance being anisotropic and in accordance with the pressure exerted thereon, the resistance reducing with increased applied pressure and increasing with reduced applied pressure, between a quiescent state in the absence of pressure and an electrically conducting state when the composition is subject to an applied pressure, and electrical connections to said polymer composition.

12. A force sensor according to claim 11, wherein the second electrically conductive filler is comprised of magnetite.

13. A force sensor according to claim 12, wherein the magnetite is synthetic magnetite and/or naturally occurring magnetite processed such that the particles are substantially spherical in shape.

14. A force sensor according to claim 12, wherein the magnetite has a particle size of five microns or less.

15. A force sensor according to claim 14, wherein the particle size of the magnetite is less than one micron.

16. A force sensor according to claim 15, wherein the particle size of the magnetite is between 0.1 and 0.3 micron.

17. A force sensor according to claim 16, wherein the particle size of the magnetite is around 0.2 micron.

18. A force sensor according to claim 11, wherein the first electrically conductive filler is spiky nickel.

19. A force sensor according to claim 18, wherein the particle size of the spiky nickel is around 3 micron.

20. A force sensor according to claim 11, wherein the polymer binder is one of: polyurethane, polyvinyl acetate, polyvinyl chloride, an acrylic polymer, natural rubber and silicone.

* * * * *